United States Patent
Uchiumi et al.

(10) Patent No.: US 11,873,780 B2
(45) Date of Patent: Jan. 16, 2024

(54) COMBINED OIL RING

(71) Applicant: NIPPON PISTON RING CO., LTD., Saitama (JP)

(72) Inventors: Masahiro Uchiumi, Saitama (JP); Kenji Arai, Saitama (JP); Kazuhiro Sameshima, Saitama (JP); Makoto Kajiwara, Saitama (JP); Hajime Ando, Saitama (JP)

(73) Assignee: NIPPON PISTON RING CO., LTD., Saitama (JP)

( * ) Notice: Subject to any disclaimer, the term of this patent is extended or adjusted under 35 U.S.C. 154(b) by 188 days.

(21) Appl. No.: 17/424,927

(22) PCT Filed: Jan. 31, 2020

(86) PCT No.: PCT/JP2020/003802
§ 371 (c)(1),
(2) Date: Jul. 22, 2021

(87) PCT Pub. No.: WO2020/158949
PCT Pub. Date: Aug. 6, 2020

(65) Prior Publication Data
US 2022/0090558 A1    Mar. 24, 2022

(30) Foreign Application Priority Data

Feb. 1, 2019 (JP) .................. 2019-017454
Nov. 21, 2019 (JP) .................. 2019-210758

(51) Int. Cl.
*F02F 5/00* (2006.01)
*F16J 9/06* (2006.01)
*F16J 9/20* (2006.01)

(52) U.S. Cl.
CPC .................. *F02F 5/00* (2013.01); *F16J 9/06* (2013.01); *F16J 9/20* (2013.01)

(58) Field of Classification Search
CPC .................. F02F 5/00; F16J 9/06; F16J 9/20
See application file for complete search history.

(56) References Cited

U.S. PATENT DOCUMENTS

| 10,724,636 B2 * | 7/2020 | Kawasaki ................ F02F 5/00 |
| 2004/0119242 A1 * | 6/2004 | Katumaru ................ F16J 9/061 |
| | | 277/440 |

(Continued)

FOREIGN PATENT DOCUMENTS

| EP | 3 279 525 A1 | 2/2018 |
| JP | 7-119832 A | 5/1995 |

(Continued)

OTHER PUBLICATIONS

Written opinion for PCT/JP2020/003802 dated Mar. 10, 2020.
International search report for PCT/JP2020/003802 dated Mar. 10, 2020.

*Primary Examiner* — Eugene G Byrd
(74) *Attorney, Agent, or Firm* — Sughrue Mion, PLLC

(57) ABSTRACT

Provided is a combined oil ring that can provide reduction in oil consumption of the engine oil without degrading the oil sealing performance between the lower surface of the side rail and the lower surface of the oil ring groove even when the tension of the combined oil ring is reduced. The combined oil ring includes: a pair of upper and lower side rails fitted in an oil ring groove of a piston, the side rails each being formed in a planar and annular shape and having a sliding contact portion in sliding contact with a cylinder; and a spacer expander disposed between the pair of upper and lower side rails and having a seating tab portion, the seating tab portion including an upper seating tab portion and a lower seating tab portion for pressing the side rails outward, wherein, each in the pair of upper and lower side rails has, in a sectional shape of the sliding contact portion taken along an axial direction of the piston, an outermost diameter (Continued)

portion located below a center of an axial direction width of the side rail, and the combined oil ring includes an anti-tilt device at positions where the upper seating tab and the lower seating tab portion come into contact with inner peripheral sides of the side rails.

9 Claims, 12 Drawing Sheets

(56) References Cited

U.S. PATENT DOCUMENTS

| | | | |
|---|---|---|---|
| 2015/0167844 A1* | 6/2015 | Yabune | F16J 9/068 |
| | | | 277/477 |
| 2017/0175893 A1* | 6/2017 | Fujita | F02F 5/00 |
| 2017/0227126 A1* | 8/2017 | Kawasaki | F16J 9/06 |
| 2018/0051806 A1* | 2/2018 | Murata | F16J 9/066 |
| 2020/0124174 A1* | 4/2020 | Mochizuki | F02F 5/00 |

FOREIGN PATENT DOCUMENTS

| | | | | | |
|---|---|---|---|---|---|
| JP | 7-119833 A | | 5/1995 | | |
| JP | 2016-35326 A | | 3/2016 | | |
| JP | 2016156411 A | * | 9/2016 | | F16J 9/06 |
| JP | 2016169791 A | * | 9/2016 | | F16J 9/06 |
| JP | 2017-3056 A | | 1/2017 | | |
| JP | 2017172616 A | * | 9/2017 | | F02F 5/00 |

* cited by examiner

COMBINED OIL RING

CROSS-REFERENCE TO RELATED APPLICATIONS

This application is a National Stage of International Application No. PCT/JP2020/003802 filed Jan. 31, 2020, which claims priority under U.S.C. § 119(a) to Japanese Patent Application No. JP2019-017454 filed on Feb. 1, 2019 and Japanese Patent Application No. JP2019-210758 filed on Nov. 21, 2019, the entirety of each being incorporated herein by reference.

TECHNICAL FIELD

The present invention relates to a combined oil ring, and in particular to a combined oil ring of 3-piece configuration including a pair of upper and lower side rails and a spacer expander disposed between the side rails.

BACKGROUND ART

Traditionally, there have been known oil rings that scrape off excessive engine oil adhering to an inner wall surface of a cylinder of an internal combustion engine and form moderate oil film to prevent seizure of a piston occurring with operation of the internal combustion engine and reduce wear of sliding contact interfaces between the oil ring and the cylinder. Various forms of such oil rings have been known. For example, as described in Patent Literature 1 cited below, a combined oil ring has been known, which includes a pair of upper and lower side rails and a spacer expander disposed between the side rails, in which the combined oil ring has side rails in a tapered shape linearly expanding from up to down of the piston in a sectional shape along an axial direction of the piston in a sliding portion.

Further, for example, as described in Patent Literature 2, a known shape of the spacer expander is configured to be pressed against the side rails in an inclined surface to prevent reduction in sealability of upper and lower surfaces of an oil ring groove even under specific conditions such as under high negative pressure conditions.

CITATION LIST

Patent Literature

Patent Literature 1: Japanese Patent Laid-Open No. 2016-035326

Patent Literature 2: Japanese Patent Laid-Open No. 7-119832

In response to a need for low fuel consumption in recent years, it has been a practice to reduce a tension of the combined oil ring by reducing a pressing force of the combined oil ring exerted on the inner wall of the cylinder to reduce friction.

SUMMARY OF INVENTION

Technical Problem

However, in the combined oil ring that has side rails in what is called a tapered shape as described in Patent Literature 1, as illustrated in FIG. 10, the sliding portion of a side rail 111 is displaced below the center of the axial direction width of the side rail 111. When the tension of the combined oil ring is reduced, a location where a reaction force from the cylinder is generated coincides with the sliding portion when the side rail 111 comes into sliding contact with the inner wall of the cylinder as the piston moves up and down. Consequently, a momentum force M is generated on the side rail 111 with the vicinity of an outer peripheral side of a side rail support portion 119 being the fulcrum, and the momentum force M acts on the side rail 111 to move an outer peripheral side thereof downward, which may have left the outer periphery of the side rail 111 tilted downward.

As described above, a problem is that in a state in which the outer periphery of the side rail 111 is tilted downward, oil sealing performance between a lower surface of the side rail 111 and a lower surface of an oil ring groove is degraded, and thus a desired performance cannot be exerted.

Accordingly, an object of the present invention, which has been made in view of the above problem, is to provide a combined oil ring that can provide reduction in oil consumption of the engine oil without degrading the oil sealing performance between the lower surface of the side rail and the lower surface of the oil ring groove even when the tension of the combined oil ring is reduced.

Solution to Problem

A combined oil ring according to the present invention includes: a pair of upper and lower side rails fitted in an oil ring groove of a piston, the side rails each being formed in a planar and annular shape and having a sliding contact portion in sliding contact with a cylinder; and a spacer expander disposed between the pair of upper and lower side rails and having a seating tab portion, the seating tab portion including an upper seating tab portion and a lower seating tab portion for pressing the side rails outward, wherein, each in the pair of upper and lower side rails has, in a sectional shape of the sliding contact portion taken along an axial direction of the piston, an outermost diameter portion located below a center of an axial direction width of the side rail, and the combined oil ring includes an anti-tilt device that prevents the side rails from tilting due to sliding contact with the cylinder at positions where the upper seating tab portion and the lower seating tab portion come into contact with inner peripheral sides of the side rails.

Preferably, in the combined oil ring according to the present invention, the anti-tilt device has contact surfaces in the upper seating tab portion and the lower seating tab portion contacting with the upper side rail and the lower side rail respectively, the contact surfaces having an upper inclined surface and a lower inclined surface, each sectional shape of the inclined surfaces along the axial direction of the piston being inclined with respect to the axial direction of the piston by a predetermined angle, an inclined angle $\theta1$ of the upper inclined surface is defined to be 2 to 18 degrees, an inclined angle $\theta2$ of the lower inclined surface is defined to be 7 to 23 degrees, and the inclined angle $\theta1$ of the upper inclined surface is defined to be smaller than the inclined angle $\theta2$ of the lower inclined surface.

Preferably, in the combined oil ring according to the present invention, a difference between the inclined angles of the upper inclined surface and the lower inclined surface ($\Delta\theta=\theta2-\theta1$) is defined to be at least 5 degrees or more and 20 degrees or less.

Preferably, in the combined oil ring according to the present invention, the anti-tilt device has contact surfaces on inner peripheral sides of the upper side rail and the lower side rail contacting with the upper seating tab portion and the lower seating tab portion respectively being formed in an asymmetrical shape with respect to a center line substantially in parallel to a horizontal direction of the piston.

Preferably, in the combined oil ring according to the present invention, the contact surfaces on the inner peripheral sides of the upper side rail and the lower side rail are segmented into an inner peripheral upper portion located above the center line and an inner peripheral lower portion located below the center line, the inner peripheral upper portion has an inner peripheral upper arcuate portion, the inner peripheral lower portion has an inner peripheral lower arcuate portion, and a radius R of the inner peripheral upper arcuate portion is larger than a radius R of the inner peripheral lower arcuate portion.

Preferably, in the combined oil ring according to the present invention, in a position where the inner peripheral upper portion and the inner peripheral lower portion are continuous with each other, there is a linear portion substantially in parallel to the axial direction.

Preferably, in the combined oil ring according to the present invention, the radius R of the inner peripheral upper arcuate portion is defined to be ⅓ or more of an axial dimension of the side rail.

Preferably, in the combined oil ring according to the present invention, each in the pair of upper and lower side rails has a tapered shape linearly expanding from up to down of the piston in the sectional shape of the sliding contact portion taken along the axial direction of the piston, the tapered shape has an angle of 8 to 12 degrees with respect to the axial direction of the piston and an apex of the tapered shape is located within 0.15 mm from a lower end of the side rails.

Preferably, in the combined oil ring according to the present invention, the apex of the tapered shape is formed in a linear portion extending substantially in parallel to the axial direction of the piston.

Advantageous Effects of Invention

The combined oil ring according to the present invention includes a pair of upper and lower side rails, each side rail of which has, in the sectional shape of the sliding contact portion taken along the axial direction of the piston, an outermost diameter portion located below the center of the axial direction width of the side rail, and an anti-tilt device that prevents the side rails from tilting due to sliding contact with the cylinder at positions where the upper seating tab portion and the lower seating tab portion come into contact with inner peripheral sides of the side rails. In this way, the combined oil ring has the anti-tilt device that reduces the momentum force imparted to the side rails even when the piston slides on the cylinder liner, or prevents leading ends of the side rails from tipping downward against the momentum force when the side rails are subjected to the momentum force because a force that holds the internal diameter sides of the side rails downward is imparted. Accordingly, it is possible to prevent the ability of scraping off oil from being degraded and reduce the oil consumption by preventing oil suction under the negative pressure in the combustion chamber.

DESCRIPTION OF EMBODIMENTS

Preferable embodiments for implementing the present invention will now be described with reference to drawings. The embodiments described below are not intended to limit the claimed invention, and all combinations of features described in the embodiments are not necessarily essential to the inventive solution.

First Embodiment

Figure 1:
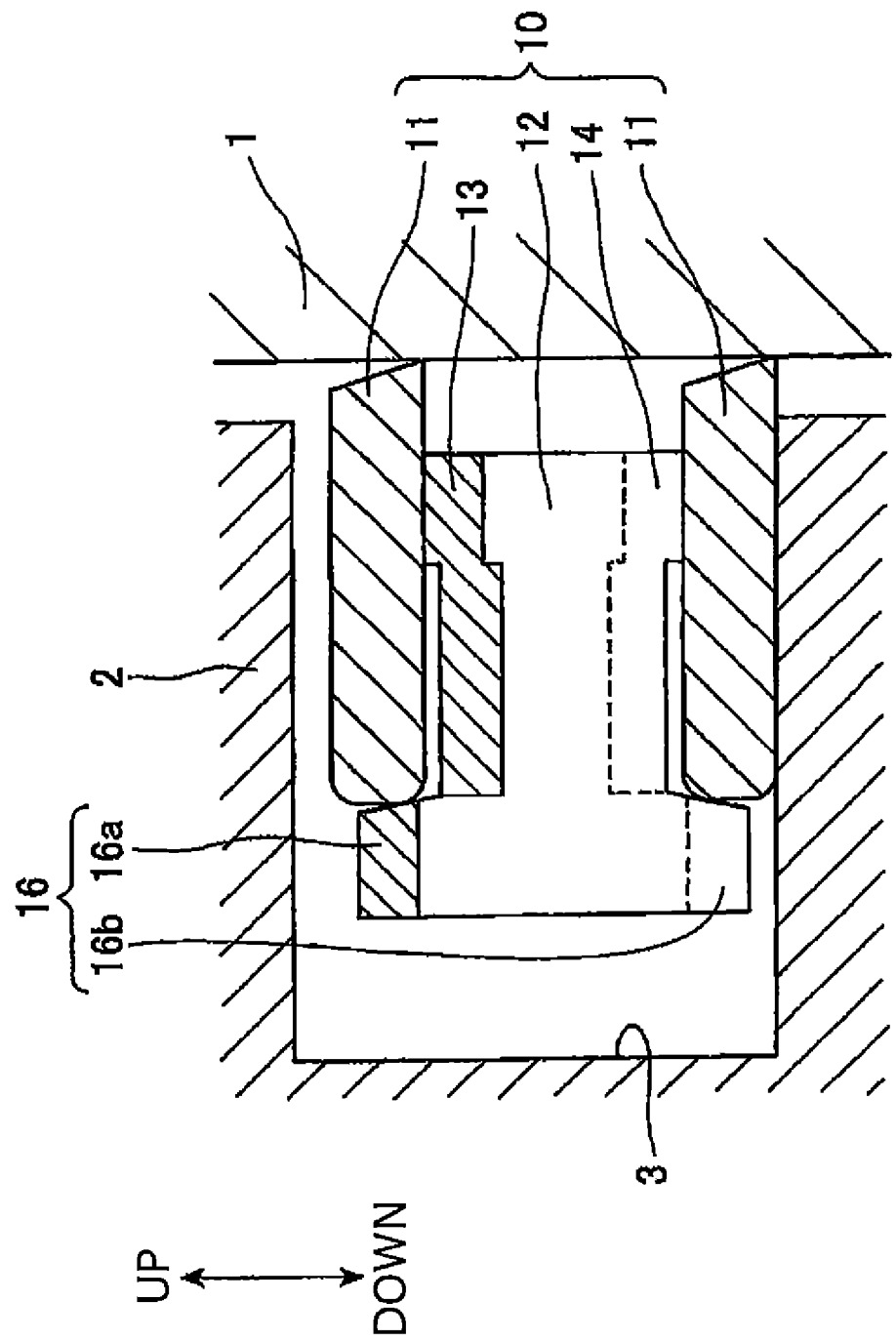
FIG. 1 is a schematic view illustrating main-part sections cut along the axial direction of a cylinder of an internal combustion engine with a combined oil ring according to a first embodiment of the present invention being assembled.
Figure 2:
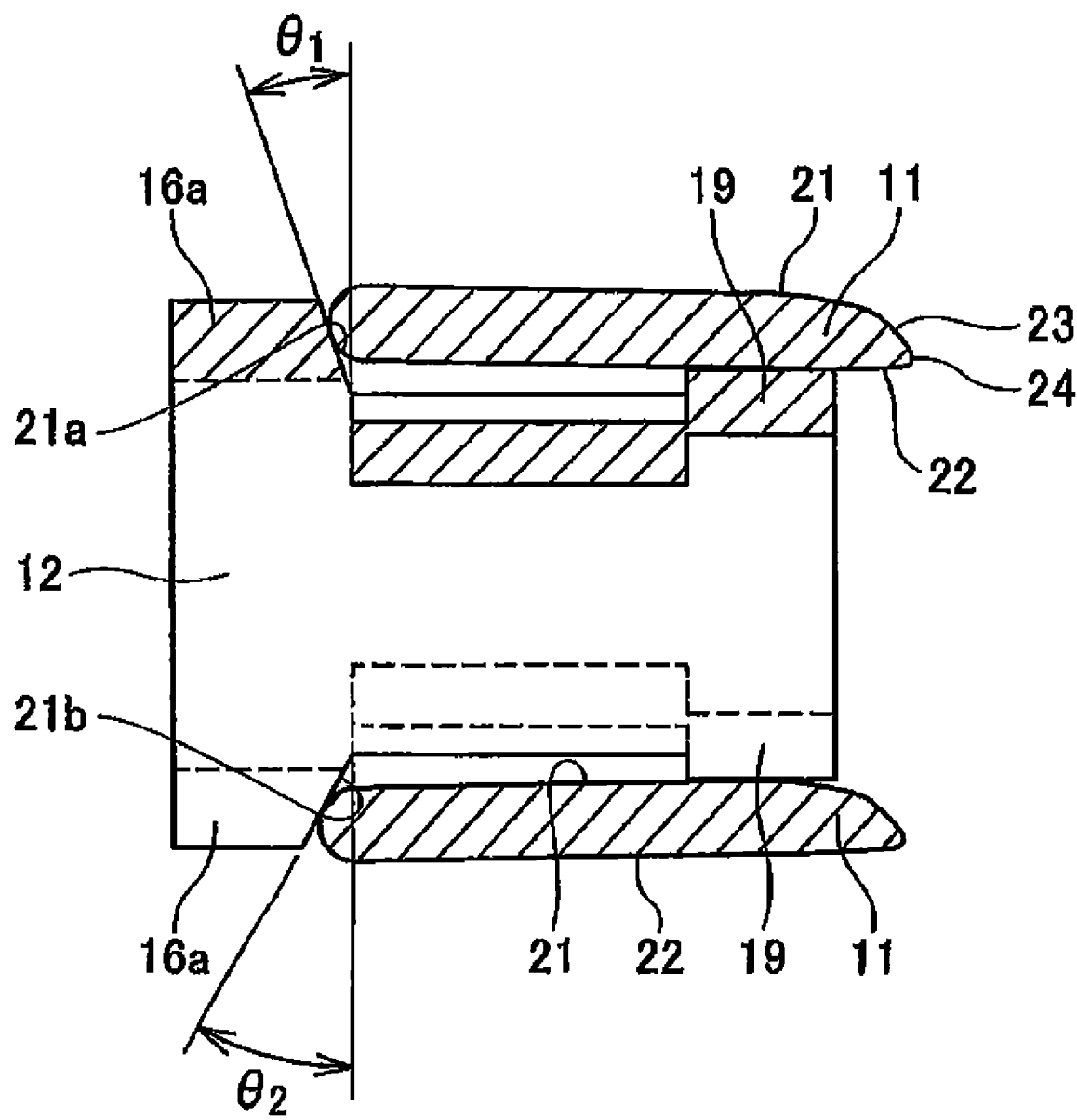
FIG. 2 is a sectional view illustrating the combined oil ring according to the first embodiment of the present invention cut along an II-II section in FIG. 3.
Figure 3:
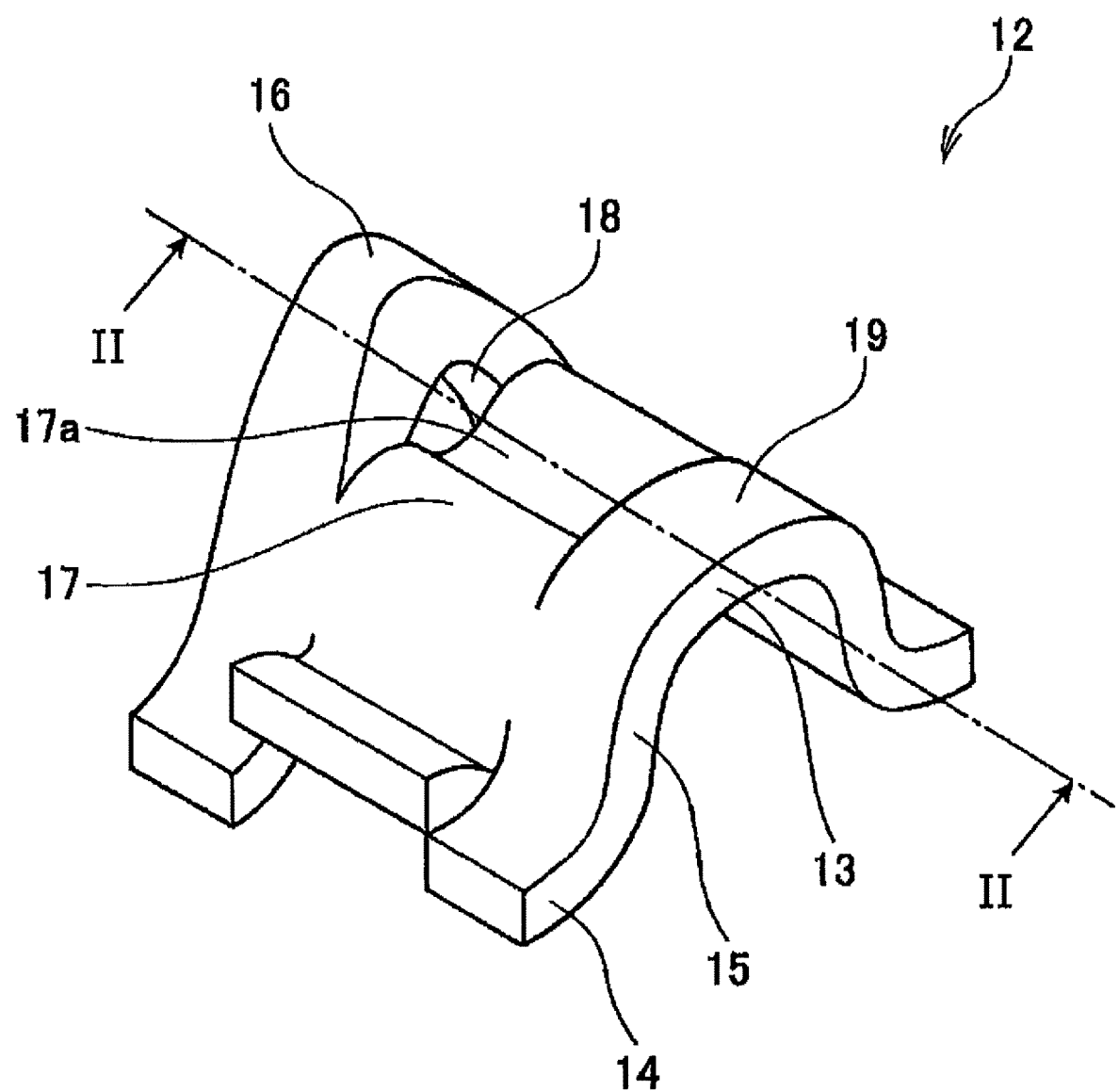
FIG. 3 is a perspective view illustrating a part of a spacer expander used in the combined oil ring according to the first embodiment of the present invention.
Figure 4:
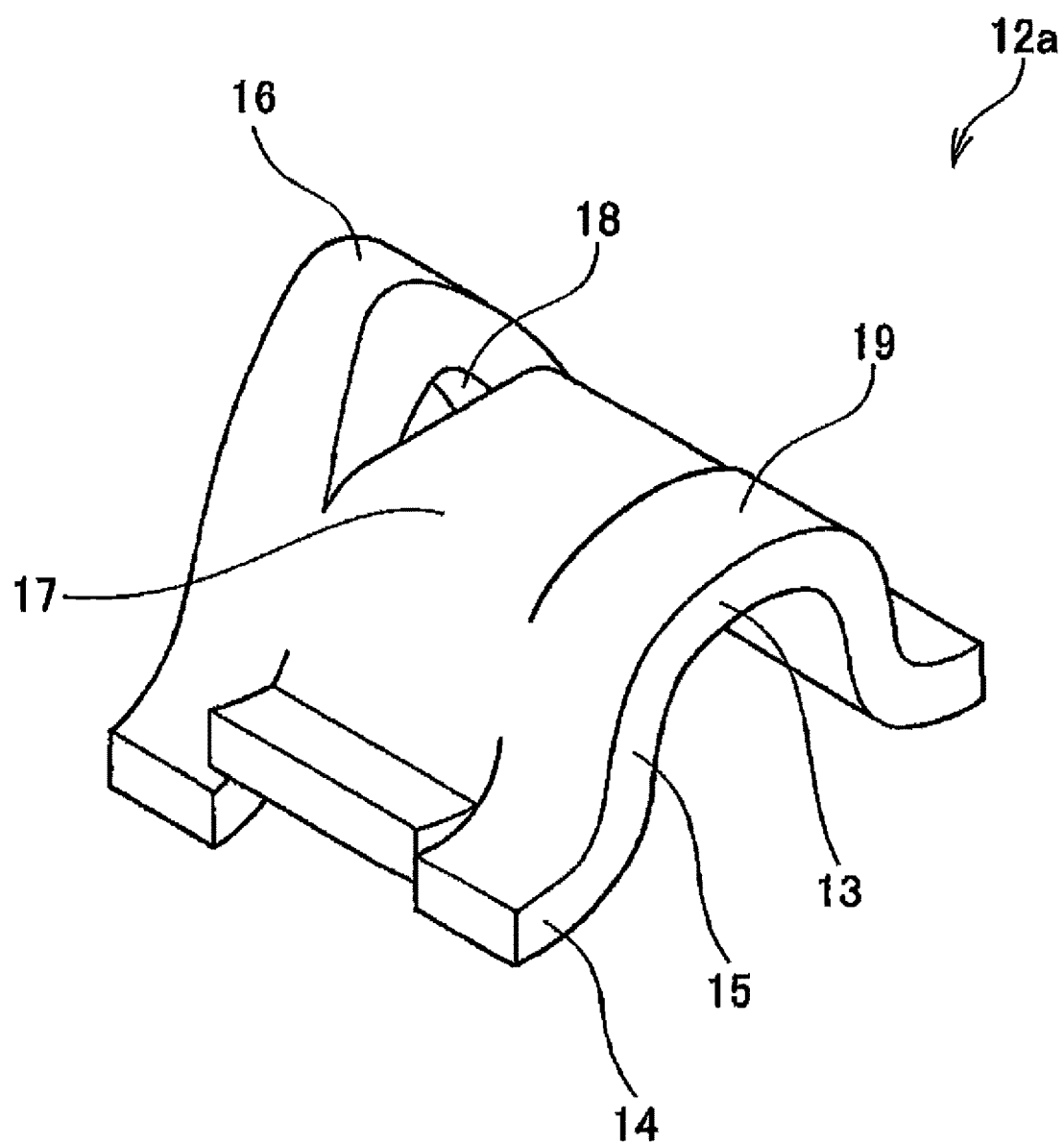
FIG. 4 is a perspective view illustrating a part of a variation of the spacer expander used in the combined oil ring according to the first embodiment of the present invention.
Figure 5:
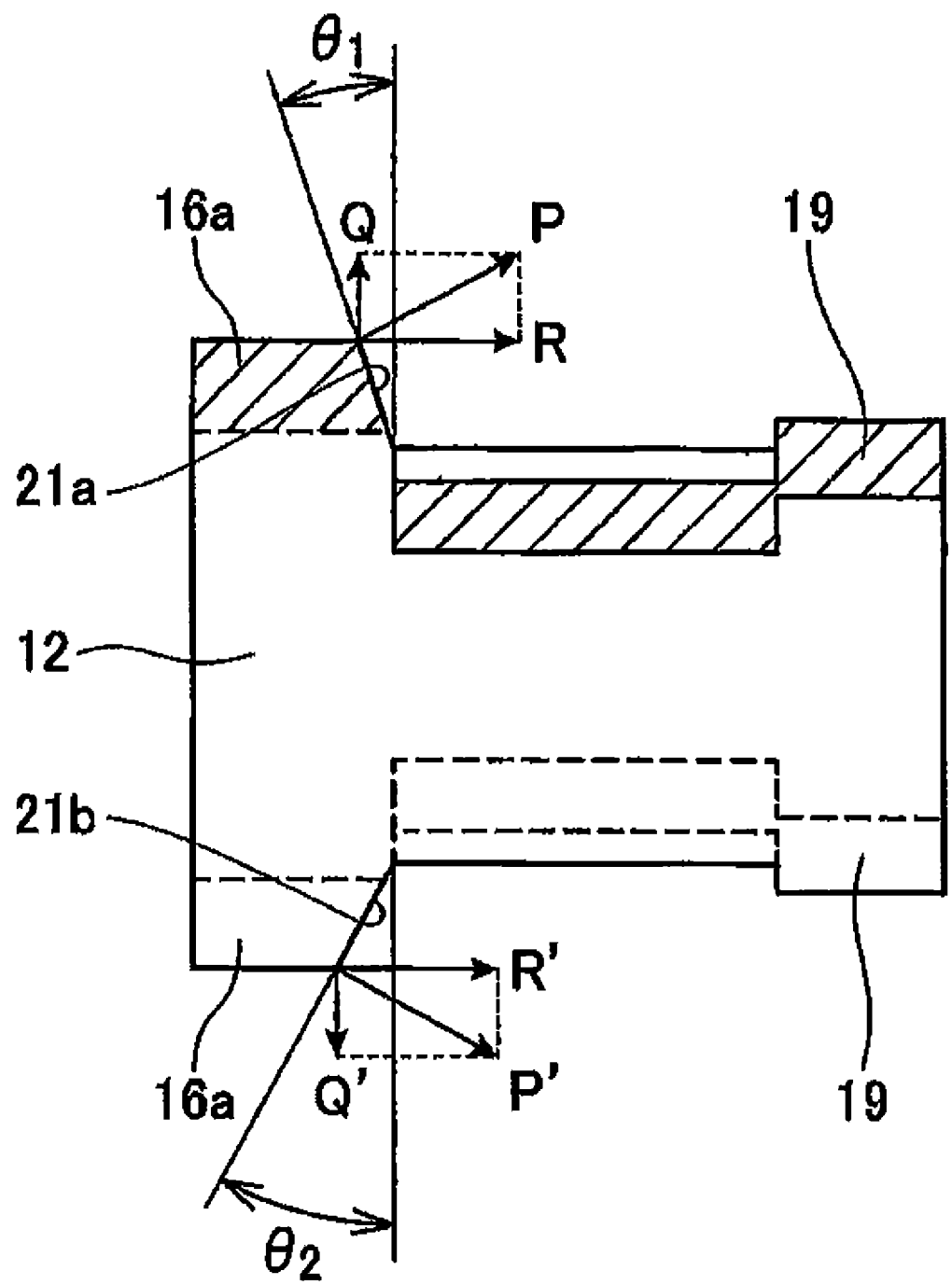
FIG. 5 is a sectional view illustrating the spacer expander used in the combined oil ring according to the first embodiment of the present invention.

FIG. 1 is a schematic view illustrating main-part sections cut along the axial direction of a cylinder of an internal combustion engine with a combined oil ring according to a first embodiment of the present invention being assembled. FIG. 2 is a sectional view illustrating the combined oil ring according to the first embodiment of the present invention cut along an II-II section in FIG. 3. FIG. 3 is a perspective view illustrating a part of a spacer expander used in the combined oil ring according to the first embodiment of the present invention. FIG. 4 is a perspective view illustrating a part of a variation of the spacer expander used in the combined oil ring according to the first embodiment of the present invention. FIG. 5 is a sectional view illustrating the spacer expander used in the combined oil ring according to the first embodiment of the present invention. It is to be noted that the up-down direction as used herein is defined as the direction connecting the upper part and the lower part on the paper are connected of FIG. 1.

As illustrated in FIG. 1, a combined oil ring 10 according to an embodiment is a member that is assembled in an oil ring groove 3 formed in an outer peripheral surface of a piston 2 of an internal combustion engine and comes into sliding contact with an inner wall of a cylinder 1 to scrape off excessive engine oil adhering to the inner wall of the cylinder 1 and form a suitable oil film on the inner wall of the cylinder 1.

The combined oil ring 10 is made up of a pair of upper and lower side rails 11, 11 and a spacer expander 12 disposed between the pair of upper and lower side rails 11, 11. The side rails 11, 11 and the spacer expander 12 are made of steel and the like, and the side rail 11 is formed as a planar annular ring provided with joint ends (not illustrated).

As illustrated in FIG. 3, the spacer expander 12 is formed by a steel material subjected to plastic working, and is formed into an undulated shape (wave shape) along the axial direction and a substantially circular shape in the circumferential direction. With the undulated shape in the axial direction, an upper piece 13 and a lower piece 14 are formed at ends in the axial direction. In other words, the spacer expander 12 is provided with a number of upper pieces 13 and lower pieces 14 spaced apart in the axial direction and the circumferential direction and arranged alternately in the circumferential direction, and the upper piece 13 and the lower piece 14 adjacent to each other are connected with a connecting piece 15.

As illustrated in FIG. 1, on the inner peripheral side ends of the upper piece 13 and the lower piece 14 of the spacer expander 12, a seating tab portion 16 that presses the side rails 11, 11 against the outer peripheral side is formed in an arch shape in a standing manner. The seating tab portion 16 includes an upper seating tab portion 16a that presses the upper side rail 11 against the outer peripheral side and a lower seating tab portion 16b that presses the lower side rail 11 against the outer peripheral side.

Further, as illustrated in FIG. 3, a through hole 18 is formed in the seating tab portion 16 along the radial direction and grooves 17 are formed on the upper surface of the upper piece 13 and the lower surface (not illustrated) of lower piece 14 along the radial direction, respectively. Further, on the outer peripheral side ends of the upper piece 13 and the lower piece 14 of the spacer expander 12, a side rail support portion 19 which is formed one step higher than the groove 17 is formed.

The spacer expander 12 according to the embodiment has formed thereon a recessed portion 17a, which is formed in a V-shape or a round shape in its sectional shape along the groove 17 in the radial direction. Since the recessed portion 17a is formed in the groove 17, the opening area of the through hole 18 is made large, and thus the flow rate of oil passing through the through hole 18 can be increased.

Forming the groove 17 on the spacer expander 12 in this way makes it possible to cause the engine oil to flow smoothly from the outer peripheral side to the inner peripheral side of the piston, so that the oil consumption (LOC) is reduced by circulating the engine oil scraped off by the piston ring in the engine and preventing the oil from leaking into the combustion chamber.

As a variation, as illustrated in FIG. 4, the spacer expander 12a according to the embodiment may have a flat surface without forming the recessed portion 17a that is formed in a V-shape or a round shape in its sectional shape along the groove 17 in the radial direction.

The spacer expander 12 is assembled in a compressed state in the circumferential direction with the joint ends being butted while it is assembled in the oil ring groove 3 of the piston 2. Accordingly, since the assembly allows an expanding force to be generated radially outward by the tension of the spacer expander 12, the outer peripheral surfaces of the upper and lower side rails 11, 11 are in close contact with the inner wall surface of the cylinder 1 by keeping the upper and lower side rails 11, 11 spaced apart up and down along the axial direction by the side rail support portions 19, 19 of the upper piece 13 and the lower piece 14 and causing the seating tab portion 16 to press the each of the inner peripheral surfaces of the side rails 11.

As illustrated in FIG. 2, each in the pair of upper and lower side rails 11 is provided with a sliding contact portion in sliding contact with the cylinder and has a tapered shape with the outer peripheral surface 23 linearly expanding from a side rail upper surface 21 toward a side rail lower surface 22 in the sectional shape along the axial direction of the piston 2 in the sliding contact portion. The outermost diameter portion (an apex 24 located at the outermost end in the radial direction) of the cylinder side end surface is located below the center of the axial direction width of the side rail 11. Preferably, the tapered shape is set to 5 to 30 degrees, more preferably 8 to 12 degrees, with respect to the axial direction of the piston, and preferably, the position of the outermost diameter portion (apex 24) is defined at a position within 0.15 mm in terms of the height from the lower surface 22 of the side rail 11.

As illustrated in FIG. 5, the contact surfaces of the seating tab portion 16 of the spacer expander 12 with the side rails 11 have an upper inclined surface 21a inclined with respect to the axial direction of the piston by a predetermined angle in the sectional shape along the axial direction of the piston and a lower inclined surface 21b. The upper inclined surface 21a and the lower inclined surface 21b impart the tension from the spacer expander 12 on the upper side rail 11 and the lower side rail 11, respectively, in normal directions P, P' of the upper inclined surface 21a and lower inclined surface 21b, and impart outwardly pressing forces to press the side rails 11 against the cylinder by radial components of force R, R'.

Preferably, the inclined angle $\theta 1$ of the upper inclined surface 21a is defined at an inclination of 2 to 18 degrees with respect to the axial direction of the piston, and preferably, the inclined angle $\theta 2$ of the lower inclined surface 21b is defined at an inclination of 7 to 23 degrees with respect to the axial direction of the piston. As illustrated in FIG. 5, the inclined angle $\theta 1$ of the upper inclined surface 21a is defined to be smaller than the inclined angle $\theta 2$ of the lower inclined surface 21b, and the difference in the inclined angles makes up an anti-tilt device. As for axial components of force Q, Q' of the tension, a downward axial component of force Q' exerted on the lower side rail 11 is larger than an upward axial components of force Q exerted on the upper side rail 11, so that a downward force is imparted by the entire combined oil ring 10. The downward force counteracts the momentum force to prevent the lower side rail 11 from tilting when subjected to the momentum force.

Preferably, the difference between the inclined angles of the upper inclined surface 21a and the lower inclined surface 21b, $\Delta\theta = \theta 2 - \theta 1$, is at least 5 degrees or more and 20 degrees or less, and more preferably, 12 degrees or more and 18 degrees or less. In this case, for example, preferably, the inclined angle $\theta 1$ of the upper inclined surface 21a is inclined at 5 degrees with respect to the axial direction of the piston and the inclined angle θ2 of the lower inclined surface 21b is inclined at 20 degrees with respect to the axial direction of the piston.

Second Embodiment

As for the combined oil ring according to the first embodiment described above, description has been made as to a case in which the inclined angle θ1 of the upper inclined surface 21a of the seating tab portion of the spacer expander is made smaller than the inclined angle θ2 of the lower inclined surface 21b to make up the anti-tilt device. As for a combined oil ring according to a second embodiment described below, description will be made as to an anti-tilt device of a mode different from that of the first embodiment. It is to be noted that identical or similar members to those in the above-described first embodiment are provided with like reference characters and detailed description will not be repeated.

Figure 6:
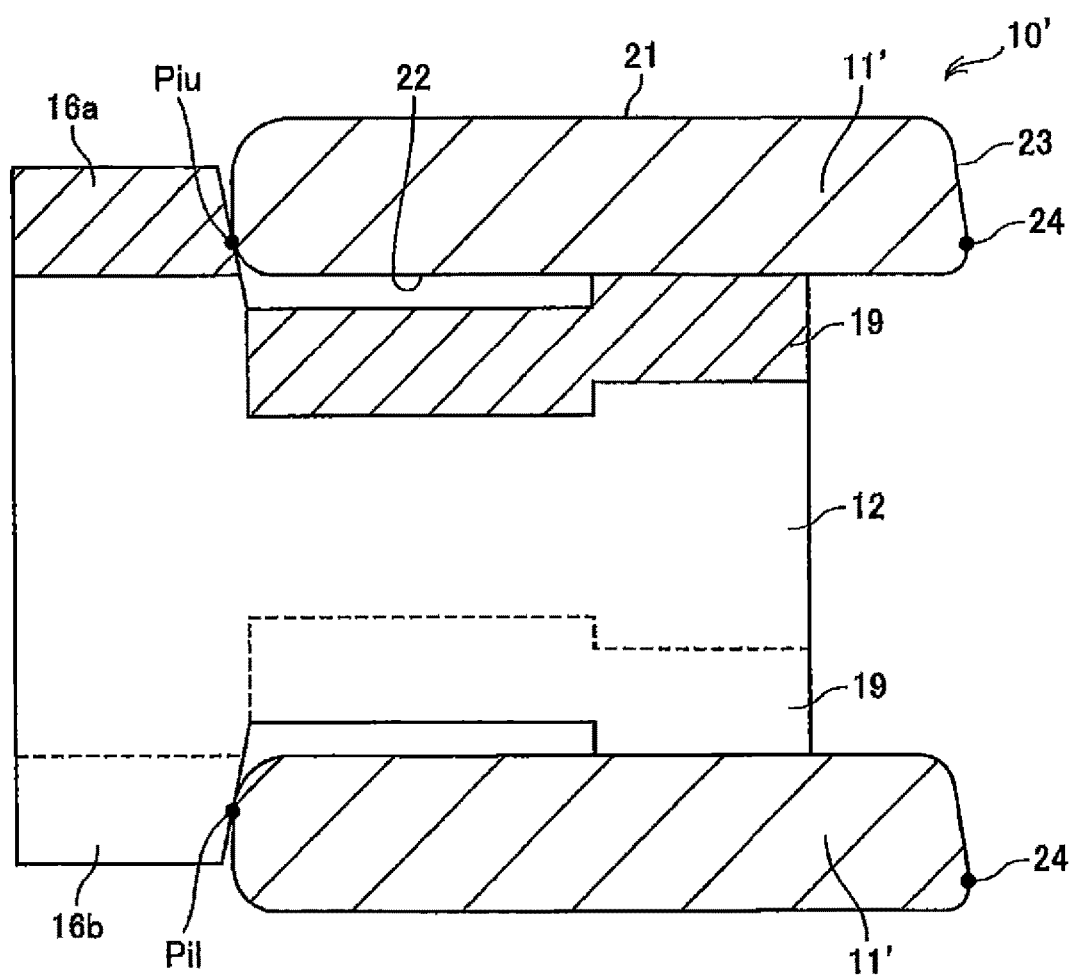
FIG. 6 is a sectional view illustrating a combined oil ring according to a second embodiment of the present invention cut in the axial direction of a cylinder of an internal combustion engine.
Figure 7:
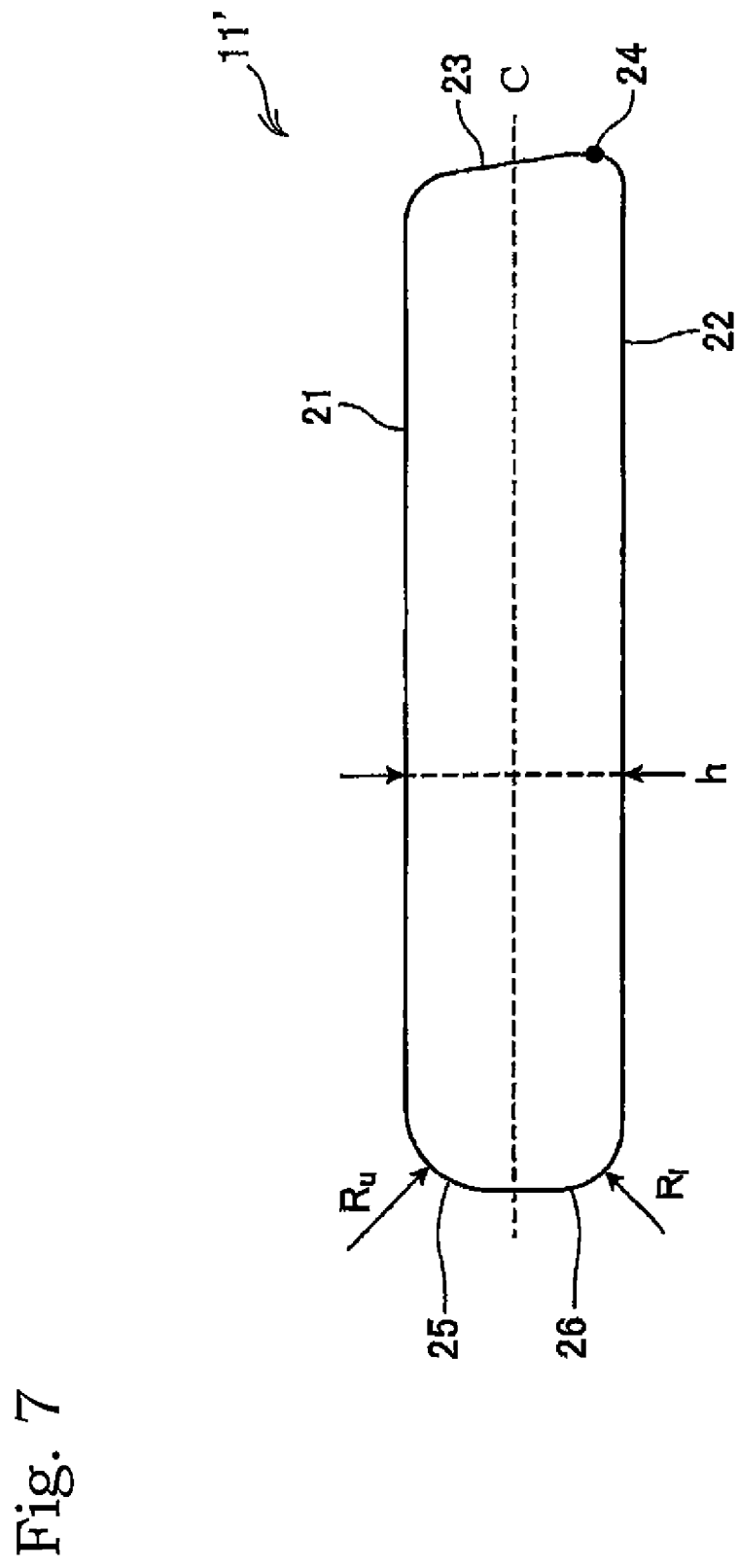
FIG. 7 is an axial sectional view of a side rail used in the combined oil ring according to the second embodiment of the present invention.
Figure 8:
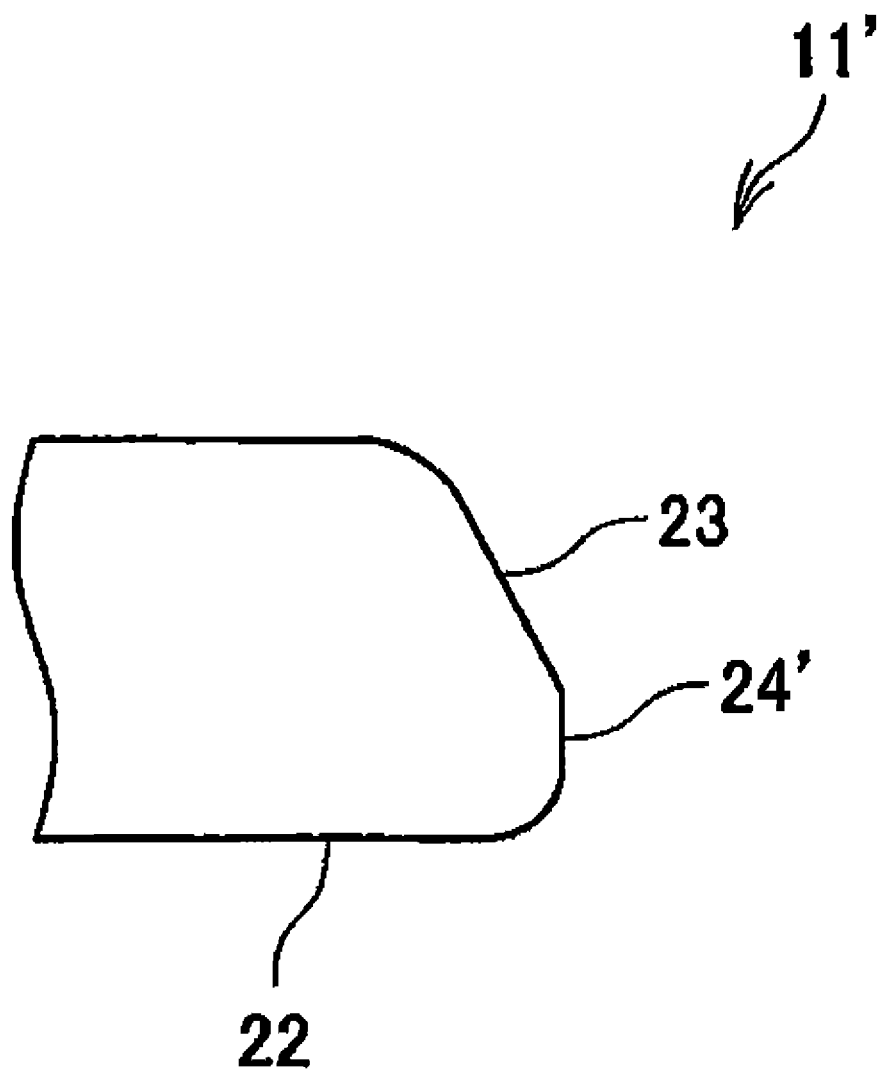
FIG. 8 is an axial sectional view illustrating a variation of the outer peripheral side of the side rail used in the combined oil ring according to the second embodiment of the present invention.
Figure 9:
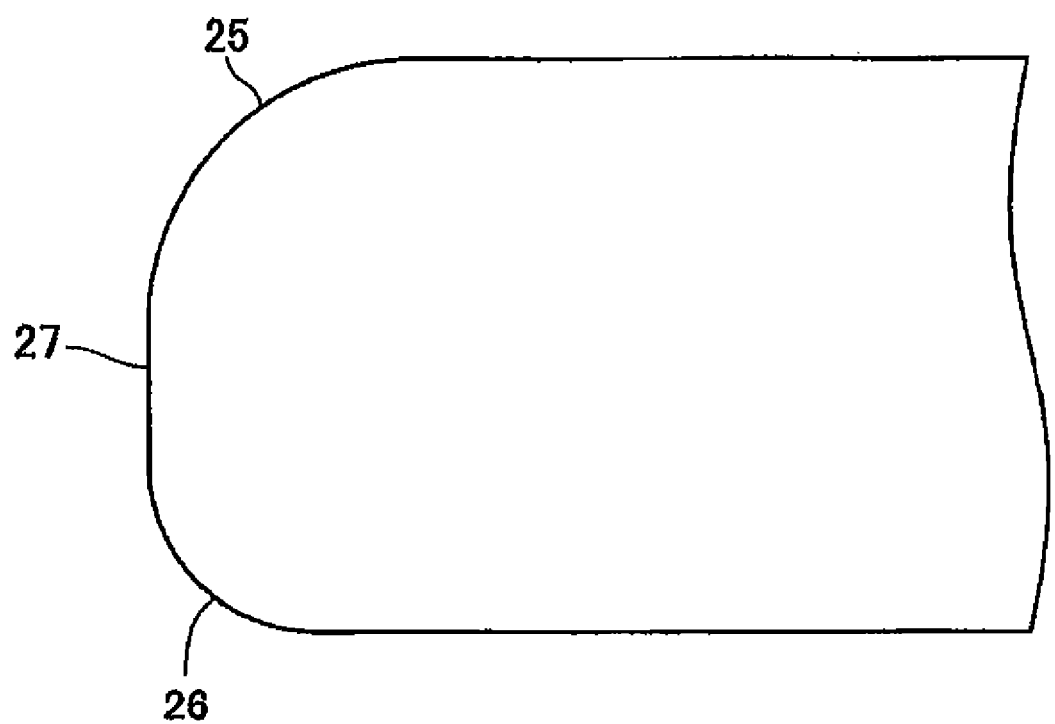
FIG. 9 is a sectional view illustrating a variation of the inner peripheral side of the side rail used in the combined oil ring according to the second embodiment of the present invention.
Figure 10:
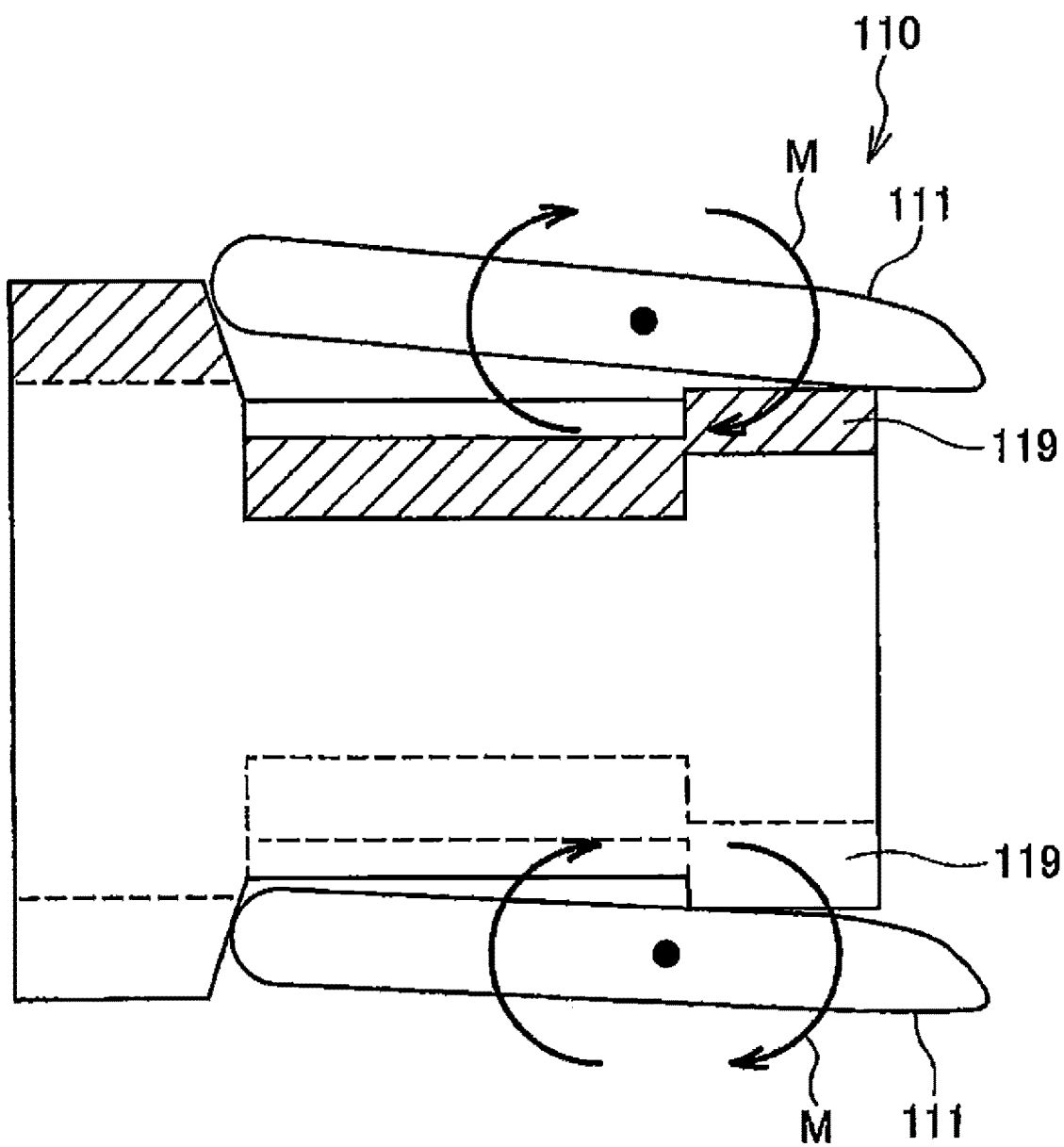
FIG. 10 is a sectional view illustrating a prior art combined oil ring cut in the axial direction of a piston.

FIG. 6 is a sectional view illustrating a combined oil ring according to a second embodiment of the present invention cut in the axial direction of a cylinder of an internal combustion engine. FIG. 7 is an axial sectional view of a side rail used in the combined oil ring according to the second embodiment of the present invention. FIG. 8 is an axial sectional view illustrating a variation of the outer peripheral side of the side rail used in the combined oil ring according to the second embodiment of the present invention. FIG. 9 is a sectional view illustrating a variation of the inner peripheral side of the side rail used in the combined oil ring according to the second embodiment of the present invention.

As illustrated in FIG. 6, in a combined oil ring 10' according to the embodiment, an anti-tilt device is formed on a pair of upper and lower side rails 11'. Specifically, as with the side rail 11 of the combined oil ring 10 according to the first embodiment described above, the side rail 11' is provided with a sliding contact portion in sliding contact with the cylinder, and has a tapered shape with the outer peripheral surface 23 linearly expanding from the side rail upper surface 21 toward the side rail lower surface 22 in the sectional shape along the axial direction of the piston 2 in the sliding contact portion. The outermost diameter portion (an apex 24 located at the outermost end in the radial direction) of the cylinder side end surface is located below the center of the axial direction width of the side rail 11'. Preferably, the tapered shape is set to 5 to 30 degrees, more preferably 8 to 12 degrees, with respect to the axial direction of the piston, and preferably, the position of the outermost diameter portion (apex 24) is defined at a position within 0.15 mm in terms of the height from the side rail lower surface 22.

As illustrated in FIG. 8, the shape of the outermost diameter portion of a pair of upper and lower side rails 11' may be formed as a linear portion 24', and the apex of the tapered shape may be the linear portion 24' extending substantially in parallel to the axial direction of the piston. The linear portion 24' of the outermost diameter portion is formed by lapping working in the axial direction to improve the roundness of the outer peripheral surface in the circumferential direction, so that the followability to the cylinder increases and the oil consumption can be reduced from the start of the operation.

As illustrated in FIG. 7, the contact surfaces on the inner peripheral side of the side rail 11' (surfaces facing the seating tab portions 16a, 16b) have asymmetrical shapes with respect to the center line C that is substantially in parallel to the horizontal direction of the piston and the asymmetrical shapes make up an anti-tilt device.

Detailing the anti-tilt device according to the embodiment, on the inner peripheral side of the side rail 11', an inner peripheral upper portion 25 above the center line C has an inner peripheral upper arcuate portion Ru, and an inner peripheral lower portion 26 below the center line C has an inner peripheral lower arcuate portion Rl. Here, the radius R of the inner peripheral upper arcuate portion Ru is defined to be larger than the radius R of the inner peripheral lower arcuate portion Rl, and, for example, preferably, the radius R of the inner peripheral upper arcuate portion Ru is defined to be ⅓ or more of an axial height h of the side rail 11' and the radius R of the inner peripheral lower arcuate portion Rl is set to, for example, R0.1 mm. More preferably, the radius R of the inner peripheral upper arcuate portion Ru is defined to be ⅓ or more and ⅔ or less of the axial height h of the side rail 11'.

In the anti-tilt device according to the embodiment, providing asymmetrical shapes to the inner peripheral sides of the side rails 11' with respect to the center line C allows contacting points Piu, Pil between the seating tab portions 16a, 16b and the inner peripheral sides of the side rails 11' to be lowered as illustrated in FIG. 6. Since the contacting points Piu and Pil on the inner peripheral sides of the side rails 11' with the seating tab portions are located below with respect to the seating tab portions 16a, 16b in this way, tilting of the side rails 11' are prevented when the outer peripheral side shape of the side rail 11' is a tapered shape by constraining the momentum force due to the apex 24, which serves as a sliding point with the cylinder, being lowered.

The inner peripheral upper portion 25 and the inner peripheral lower portion 26 are not limited to a case in which the inner peripheral upper arcuate portion Ru and the inner peripheral lower arcuate portion Rl have a single radius R, and, for example, as illustrated in FIG. 9, a linear portion 27 may be formed in a position where the inner peripheral upper portion 25 and the inner peripheral lower portion 26 are continuous with each other. Further, provided that the contacting points Piu and Pil on the inner peripheral side can be lowered by adopting asymmetrical shapes, for example, the inner peripheral upper portion 25 may have a tapered shape and the shape of the inner peripheral side of the side rail 11' may be what is called a beveled shape.

The side rails 11' used in the combined oil ring 10' according to the embodiment have shapes including an arcuate shape in the inner peripheral side shapes that come into contact with the seating tab portions 16a, 16b. Accordingly, the inner peripheral sides of the side rails 11' and the seating tab portions 16a, 16b make a larger surface contact with each other, and thus aggression to the seating tab portions 16a, 16b of the spacer expander 12' is reduced and the wear of the seating tab portions 16a, 16b can be alleviated.

EXAMPLES

Next, to make a further specific description as to the present invention, examples and comparative examples were prepared and functional tests were conducted on the combined oil rings 10, 10' according to the embodiment. The functional tests were conducted by using a 2.5 liter in-line 4-cylinder automobile gasoline engine. Measurements were taken about the oil consumption (LOC) of combined oil rings of a prior art and those according to the present invention under test conditions of the engine speed of 6000 r/min and WOT (wide open throttle), and a relative ratio is used to make an examination such that the value of a prior-art example equals to 1.

Figure 11:
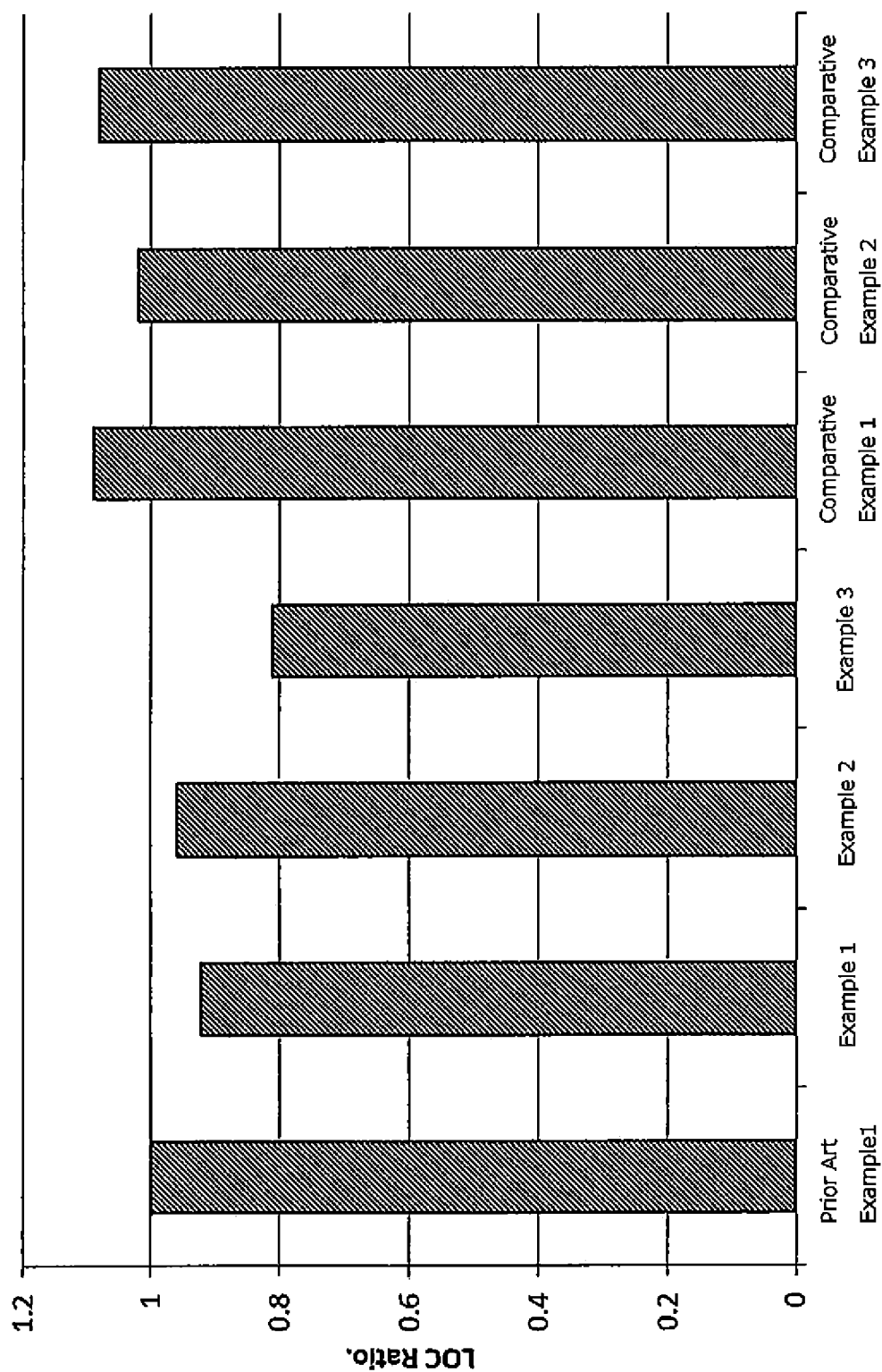
FIG. 11 illustrates measurement results of comparison of oil consumption between the combined oil ring according to the first embodiment of the present invention and the prior art oil ring.
Figure 12:
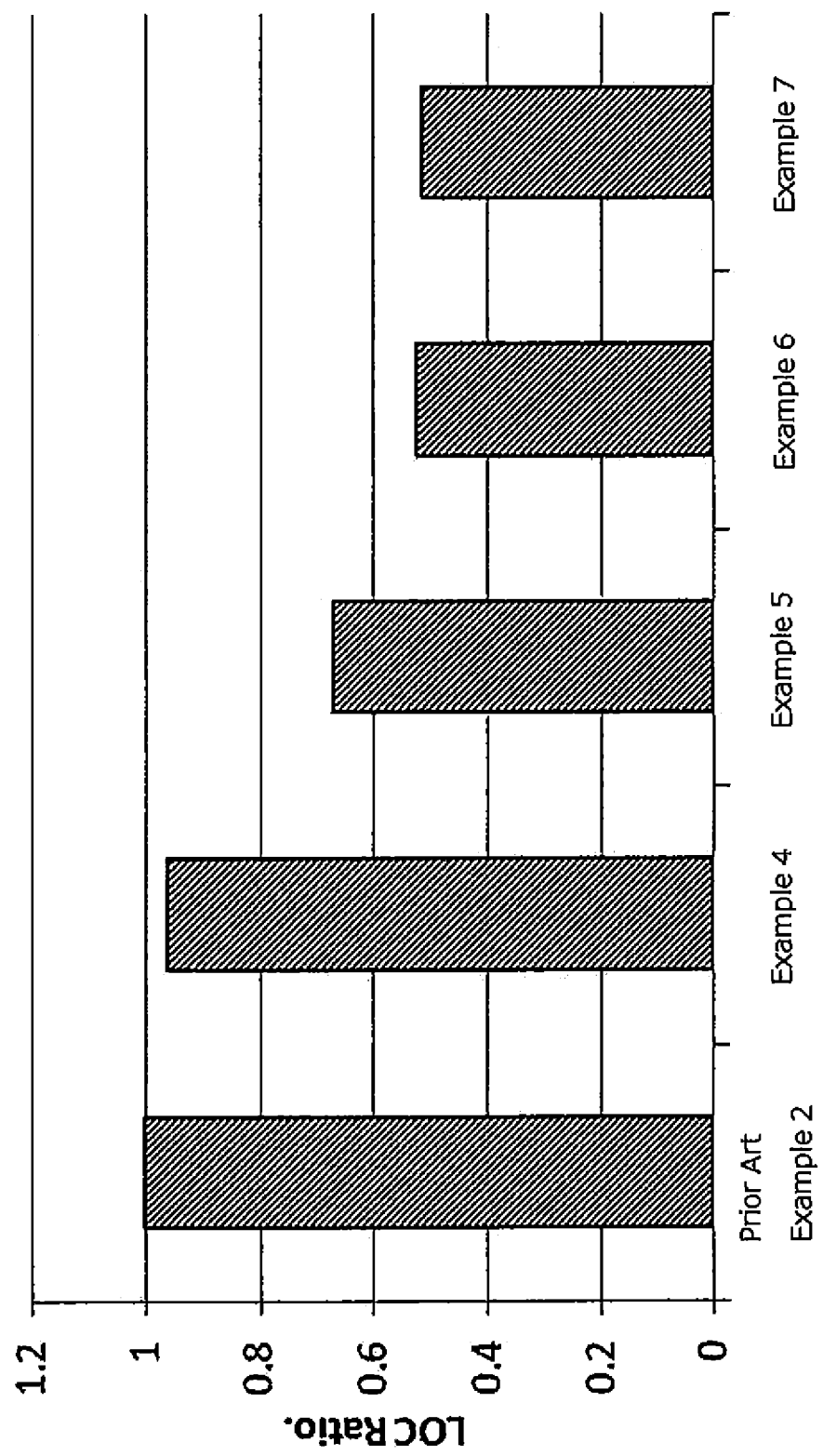
FIG. 12 illustrates measurement results of comparison of oil consumption between the combined oil ring according to the second embodiment of the present invention and the prior art oil ring.

FIG. 11 illustrates measurement results of comparison of oil consumption between the combined oil rings 10 according to the first embodiment and prior art oil rings, and FIG. 12 illustrates measurement results of comparison of oil consumption between the oil rings 10' according to the second embodiment and prior art oil rings.

Films made of Cr—N were deposited by ion plating on the outer peripheral surfaces of the side rails of the first compression ring and the oil ring. After the films were deposited by ion plating, the outer peripheral surfaces of the oil ring were subjected to lapping processes to smoothen convex and tapered portions of the outer peripheral surfaces.

Other test conditions are as follows:
Piston Bore Diameter: 87.5 mm
Engine Speed: 6000 r/min
Piston Stroke: 103.4 mm
Side Rail Radial Thickness: 1.70 mm
Side Rail Axial Thickness: 0.35 mm
Side. Rail Outer Peripheral Angle θ: 10 degrees
Oil Ring Axial Direction Width: 2.0 mm In Example 1, seating tab angles of the spacer expander are set to 2 degrees for the inclined angle of the upper inclined surface and 7 degrees for the inclined angle of the lower inclined surface, respectively. In Example 2, seating tab angles of the spacer expander are set to 18 degrees for the inclined angle of the upper inclined surface and 23 degrees for the inclined angle of the lower inclined surface, respectively. In Example 3, seating tab angles of the spacer expander are set to 5 degrees for the inclined angle of the upper inclined surface and 20 degrees for the inclined angle of the lower inclined surface, respectively. In Comparative example 1, seating tab angles of the spacer expander are set to 18 degrees for the inclined angle of the upper inclined surface and 15 degrees for the inclined angle of the lower inclined surface, respectively. In Comparative example 2, seating tab angles of the spacer expander are set to 23 degrees for the inclined angle of the upper inclined surface and 30 degrees for the inclined angle of the lower inclined surface, respectively. In Comparative example 3, seating tab angles of the spacer expander are set to 0 degrees for the inclined angle of the upper inclined surface and 5 degrees for the inclined angle of the lower inclined surface, respectively. In Prior-art example 1, seating tab angles of the spacer expander are set to 10 degrees for both the inclined angle of the upper inclined surface and the inclined angle of the lower inclined surface.

As illustrated in FIG. 11, it was confirmed that when the inclined angle of the upper inclined surface is defined to be smaller than the inclined angle of the lower inclined surface, the oil consumption ratio was improved as much as 5% to 10% as evident from Example 1 or Example 2. Further, it was confirmed that when the difference between the inclined angle of the upper inclined surface and the inclined angle of the lower inclined surface was 15 degrees, the oil consumption ratio was improved by approximately 20% as compared to the prior art.

In contrast, as in Comparative example 1, when the inclined angle of the upper inclined surface is defined to be larger than the inclined angle of the lower inclined surface, an increase as much as 10% was observed due to larger tilting of the lower side rail caused by small components of force of the lower side rail, allowing more oil to enter the oil ring groove. Further, as in Comparative example 2, when the inclined angle of the upper inclined surface is 23 degrees and the inclined angle of the lower inclined surface is 30 degrees, since larger inclined angles of the inclined surfaces make the difference small in axial components of force between the upper side rail and the lower side rail even though the axial components of force of the inclined surfaces increase, an anti-tilt effect is less likely to be produced. In addition, since increase in inclined angles of the inclined surfaces lead to increase in oil consumption at a high engine speed, merely increasing the angle cannot be a solution, and it was confirmed that the oil consumption ratio increased with respect to the prior-art example. Further, as in Comparative example 3, when the inclined angle of the upper inclined surface is 0 degrees and the inclined angle of the lower inclined surface is 5 degrees, the axial components of force of inclined surfaces are small, an effect of an inertial force on the side rails due to high speed reciprocal motion increases, and tilting of the lower side rail increases. It was therefore confirmed that more oil is allowed to enter the oil ring groove, leading to an increase as much as 10%.

Next, in Example 4, the contact surfaces on the inner peripheral side of the side rails were provided with asymmetrical shapes with respect to the center line substantially in parallel to the horizontal direction of the piston, and the radius of curvature of the inner peripheral upper arcuate portion was set to R0.11 mm and the radius of curvature of the inner peripheral lower arcuate portion was set to R0.1 mm. In Example 5, the radius of curvature of the inner peripheral upper arcuate portion was set to R0.13 mm and the radius of curvature of the inner peripheral lower arcuate portion was set to R0.1 mm. In Example 6, the radius of curvature of the inner peripheral upper arcuate portion was set to R0.165 mm and the radius of curvature of the inner peripheral lower arcuate portion was set to R0.1 mm. In Example 7, the radius of curvature of the inner peripheral upper arcuate portion was set to was set to R0.2 mm and the radius of curvature of the inner peripheral lower arcuate portion was set to R0.1 mm. In Prior-art example 2, both the radii of curvature of the inner peripheral upper arcuate portion and the inner peripheral lower arcuate portion were set to R0.1 mm. Comparison was then made as to the oil consumption.

As illustrated in FIG. 12, when the radius of curvature of the inner peripheral upper arcuate portion was defined to be larger than the radius of curvature of the inner peripheral lower arcuate portion, the oil consumption ratio could be reduced as compared to the prior art. In particular, approximately 35% in Example 5 and approximately 50% in Example 6 and Example 7 of reduction in the oil consumption were confirmed.

On the side rail upper surfaces 21 of the combined oil rings 10, 10' according to the above-described embodiment, there may be provided a recessed portion and the like as a device for front/back discrimination, which is not illustrated. Since it is only necessary that the side rail upper surface 21 can be distinguished, the recessed portion may be formed in an annular shape or in a dotted arrangement on the side rail upper surface 21. For forming the recessed portion, it may be pressed, punched, or laser worked on the side rail, or, for example, may be formed simultaneously with drawing processes of wire rods, such as roll drawing and dies drawing. Further, instead of providing the recessed portion, intermittent or continuous paint may be applied on the side rail upper surface 21 or the lower surface 22, or either one of the upper surface 21 or the lower surface 22 may be formed to have a different surface roughness for tactile front/back discrimination: for example, the upper surface 21 may be processed to be smooth and the lower surface 22 may be processed to be rough. In such a case, without dependent on visual discrimination, it is assured that front/back discrimination can be performed under insufficient illumination in the workplace.

Further, the combined oil rings 10, 10' according to the above-described embodiment may be subjected to surface treatment on the outer peripheral surfaces of the side rails, such as a Diamond Like Carbon (DLC) film. It is obvious from claims that such variations or modified modes may be within the technical scope of the present invention.

REFERENCE SIGNS LIST

1: cylinder, 2: piston, 3: oil ring groove, 10, 10': combined oil ring, 11, 11': side rails, 12, 12': spacer expander, 16: seating tab portion, 16a: upper seating tab portion, 16b: lower seating tab portion, 19: side rail support portion, 21: side rail upper surface, 21a: upper inclined surface, 21b: lower inclined surface, 22: side rail lower surface, 23: outer peripheral surface, 24: apex, 25: inner peripheral upper portion, 26: inner peripheral lower portion, θ1: inclined angle of upper inclined surface, θ2: inclined angle of lower inclined surface, Δθ: difference in inclined angles, C: center line, Piu: inner peripheral upper arcuate portion, Pil: inner peripheral lower arcuate portion

The invention claimed is:

1. A combined oil ring, comprising:
a pair of upper and lower side rails fitted in an oil ring groove of a piston, the pair of upper and lower side rails each being formed in a planar and annular shape and having a sliding contact portion in sliding contact with a cylinder; and
a spacer expander disposed between the pair of upper and lower side rails and having a seating tab portion, the seating tab portion comprising an upper seating tab portion and a lower seating tab portion for pressing the pair of upper and lower side rails outward,
wherein, each in the pair of upper and lower side rails has, in a sectional shape of the sliding contact portion taken along an axial direction of the piston, an outermost diameter portion located below a center of an axial direction width of the pair of upper and lower side rails,
the combined oil ring comprises an anti-tilt device that prevents the pair of upper and lower side rails from tilting due to sliding contact with the cylinder at positions where the upper seating tab portion and the lower seating tab portion come into contact with inner peripheral sides of the pair of upper and lower side rails,
the anti-tilt device has contact surfaces in the upper seating tab portion and the lower seating tab portion contacting with the upper side rail and the lower side rail respectively, the contact surfaces having an upper inclined surface and a lower inclined surface, each sectional shape of the inclined surfaces along the axial direction of the piston being inclined with respect to the axial direction of the piston by a predetermined angle, and
the inclined angle θ1 of the upper inclined surface is defined to be smaller than the inclined angle θ2 of the lower inclined surface.

2. The combined oil ring according to claim 1, wherein an inclined angle θ1 of the upper inclined surface is defined to be 2 to 18 degrees, and
an inclined angle θ2 of the lower inclined surface is defined to be 7 to 23 degrees.

3. The combined oil ring according to claim 2, wherein a difference between the inclined angles of the upper inclined surface and the lower inclined surface (Δθ=θ2−θ1) is defined to be at least 5 degrees or more and 20 degrees or less.

4. A combined oil ring, comprising:
a pair of upper and lower side rails fitted in an oil ring groove of a piston, the pair of upper and lower side rails each being formed in a planar and annular shape and having a sliding contact portion in sliding contact with a cylinder; and
a spacer expander disposed between the pair of upper and lower side rails and having a seating tab portion, the seating tab portion comprising an upper seating tab portion and a lower seating tab portion for pressing the pair of upper and lower side rails outward,
wherein, each in the pair of upper and lower side rails has, in a sectional shape of the sliding contact portion taken along an axial direction of the piston, an outermost diameter portion located below a center of an axial direction width of the pair of upper and lower side rails,
the combined oil ring comprises an anti-tilt device that prevents the pair of upper and lower side rails from tilting due to sliding contact with the cylinder at positions where the upper seating tab portion and the lower seating tab portion come into contact with inner peripheral sides of the pair of upper and lower side rails, and
the anti-tilt device has contact surfaces on inner peripheral sides of the upper side rail and the lower side rail contacting with the upper seating tab portion and the lower seating tab portion respectively being formed in an asymmetrical shape with respect to a center line substantially in parallel to a horizontal direction of the piston.

5. The combined oil ring according to claim 4, wherein
the contact surfaces on the inner peripheral sides of the upper side rail and the lower side rail are segmented into an inner peripheral upper portion located above the center line and an inner peripheral lower portion located below the center line,
the inner peripheral upper portion has an inner peripheral upper arcuate portion,
the inner peripheral lower portion has an inner peripheral lower arcuate portion, and
a radius R of the inner peripheral upper arcuate portion is larger than a radius R of the inner peripheral lower arcuate portion.

6. The combined oil ring according to claim 5, wherein
in a position where the inner peripheral upper portion and the inner peripheral lower portion are continuous with each other, there is a linear portion substantially in parallel to the axial direction.

7. The combined oil ring according to claim 5, wherein
the radius R of the inner peripheral upper arcuate portion is defined to be ⅓ or more of an axial dimension of the pair of upper and lower side rails.

8. The combined oil ring according to claim 1, wherein
each in the pair of upper and lower side rails has a tapered shape linearly expanding from up to down of the piston in the sectional shape of the sliding contact portion taken along the axial direction of the piston,
the tapered shape has an angle of 8 to 12 degrees with respect to the axial direction of the piston and an apex of the tapered shape is located within 0.15 mm from a lower end of the pair of upper and lower side rails.

9. The combined oil ring according to claim 8, wherein the apex of the tapered shape is formed in a linear portion extending substantially in parallel to the axial direction of the piston.

* * * * *